(No Model.)

H. EPPELSHEIMER.
ICE CREAM AND PUDDING MOLD.

No. 330,305. Patented Nov. 10, 1885.

WITNESSES:

INVENTOR
Henry Eppelsheimer
BY
Goepel & Raegener
ATTORNEYS.

UNITED STATES PATENT OFFICE.

HENRY EPPELSHEIMER, OF NEW YORK, N. Y.

ICE-CREAM AND PUDDING MOLD.

SPECIFICATION forming part of Letters Patent No. 330,305, dated November 10, 1885.

Application filed January 20, 1885. Serial No. 153,463. (No model.)

*To all whom it may concern:*

Be it known that I, HENRY EPPELSHEIMER, of the city, county, and State of New York, have invented certain new and useful Improvements in Ice-Cream and Pudding Molds, of which the following is a specification.

This invention has reference to an improved ice-cream and pudding mold, by which ice-cream, puddings, &c., can be made into different shapes—such as melons, pineapples, and the like; and the invention consists of an ice-cream or pudding mold made of two convexo-concave shells, which are provided with hinged handles, and with means arranged at the meeting edges of the shells for locking them together.

Figure 1:
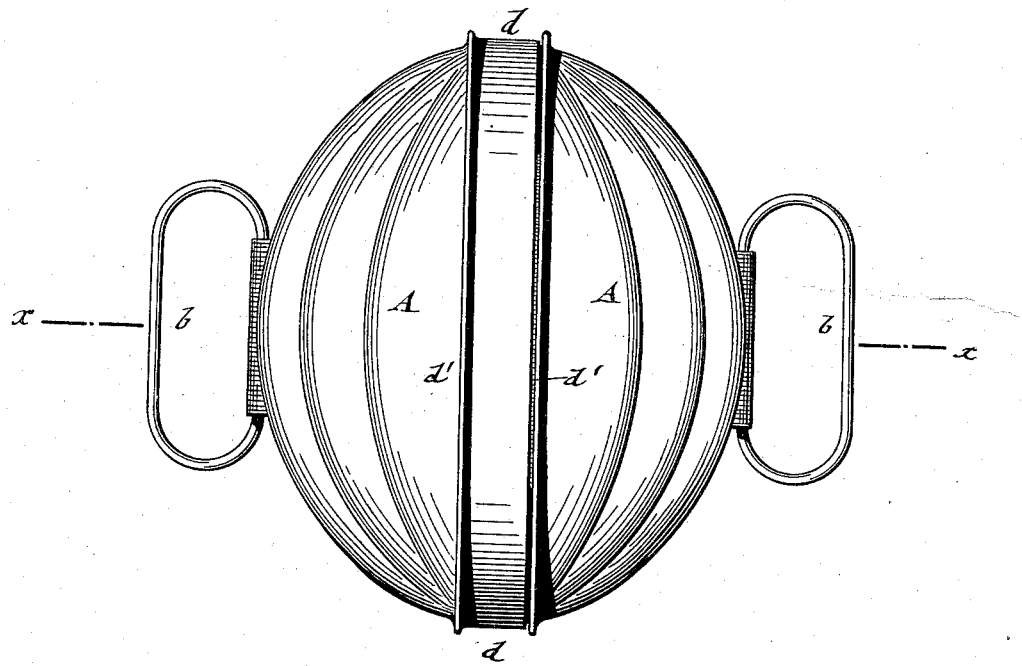
Figure 2:
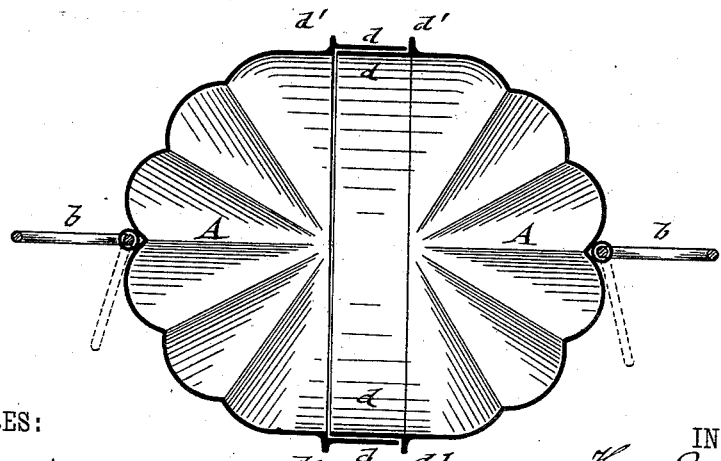

In the accompanying drawings, Figure 1 represents a side elevation, and Fig. 2 a horizontal section on line $x\ x$, Fig. 1, of my improved ice-cream and pudding mold.

Similar letters of reference indicate corresponding parts.

Referring to the drawings, A A represent two shells or sections, which together form my improved mold for ice-cream, puddings, and similar articles. The shells A A are made of sheet metal of convexo-concave shape, and provided with corrugations or depressions arranged in such a manner that a melon, pineapple, or similar form may be produced. The shells A A are provided with hinged exterior handles, $b\ b$, by which they can be conveniently taken hold of and connected with or separated from each other. The shells A A are connected at their meeting edges by means of tightly-fitting overlapping rims $d\ d$ and stop-flanges $d'\ d'$; or they may be hinged at one side and locked together by a suitable fastening at the opposite side; or they may be fastened together in any other suitable manner, as I do not confine myself to the specific construction shown in the drawings.

In using the mold the shells are separately filled with ice-cream or dough and then united by means of the fastening devices, so as to unite the contents. The handles are then folded close to the shells, so as to be out of the way.

When the ice-cream is frozen over again, or the pudding done, the shells are disconnected, and the ice-cream or pudding removed, which has then the shape of the mold, so as to be served in a more attractive manner.

I am aware that molds for culinary purposes which are made of melon-shape from one sheet of metal have been used, as, for instance, the mold shown in the patent granted to Charles Hodgetts, No. 119,146, and dated September 19, 1871, and I therefore do not claim this feature, broadly. In the mold referred to only one-half of a melon could be shaped, while in my mold bodies having the entire shape of a melon can be made.

Having thus described my invention, I claim as new and desire to secure by Letters Patent—

1. An ice-cream or pudding mold consisting of two convexo-concave shells having overlapping rims and stop-flanges at their meeting edges, substantially as set forth.

2. An ice-cream or pudding mold consisting of two convexo-concave shells having hinged handles and overlapping rims and stop-flanges at their meeting edges, substantially as set forth.

In testimony that I claim the foregoing as my invention I have signed my name in presence of two subscribing witnesses.

HENRY EPPELSHEIMER.

Witnesses:
PAUL GOEPEL,
SIDNEY MANN.